United States Patent
Raz Goldfarb et al.

(10) Patent No.: US 11,651,538 B2
(45) Date of Patent: May 16, 2023

(54) GENERATING 3D VIDEOS FROM 2D MODELS

(71) Applicant: International Business Machines Corporation, Armonk, NY (US)

(72) Inventors: Adi Raz Goldfarb, Akko (IL); Tal Drory, Haifa (IL); Oded Dubovsky, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/204,035

(22) Filed: Mar. 17, 2021

(65) Prior Publication Data
US 2022/0301247 A1    Sep. 22, 2022

(51) Int. Cl.
  *G06T 13/20* (2011.01)
  *G06T 15/20* (2011.01)
(52) U.S. Cl.
  CPC ............ *G06T 13/20* (2013.01); *G06T 15/205* (2013.01)
(58) Field of Classification Search
  None
  See application file for complete search history.

(56) References Cited

U.S. PATENT DOCUMENTS

| | | | |
|---|---|---|---|
| 10,078,970 B2 | 9/2018 | Chen | |
| 10,304,346 B2 | 5/2019 | Peterson | |
| 2013/0215239 A1* | 8/2013 | Wang | G06T 7/579 348/E13.074 |
| 2013/0321418 A1* | 12/2013 | Kirk | H04N 13/239 345/426 |
| 2014/0225978 A1 | 8/2014 | Saban | |
| 2016/0292925 A1* | 10/2016 | Montgomerie | H04W 4/18 |
| 2016/0328887 A1 | 11/2016 | Elvezio | |
| 2018/0005666 A1* | 1/2018 | Yang | H04N 17/004 |
| 2018/0144547 A1* | 5/2018 | Shakib | G06T 15/503 |
| 2019/0206131 A1* | 7/2019 | Kamal | G06T 7/80 |

OTHER PUBLICATIONS

"Dynamically Generated Product Assembly Presentation", An IP.com Prior Art Database Technical Disclosure, Authors et al.: Disclosed Anonymously, IP.com No. IPCOM000263236D, IP.com Electronic Publication Date: Aug. 10, 2020, 6 pages.

* cited by examiner

*Primary Examiner* — Peter Hoang
(74) *Attorney, Agent, or Firm* — Monchai Chuaychoo

(57) ABSTRACT

An approach for creating instructional 3D animated videos, without physical access to the object or to the object CAD models as a prerequisite is disclosed. The approach allows the user to submit some images or a video of the object and a knowledge about the required procedure. The required procedures includes, adding the instructions and text annotations. The approach will build a 3D model based on the submitted images and/or video. The approach will generate the instructional animated video based on the 3D model and the required procedure.

20 Claims, 12 Drawing Sheets

GENERATING 3D VIDEOS FROM 2D MODELS

BACKGROUND

The present invention relates generally to imaging and display system, and more particularly to generating 3D models in a video.

In the past years, digital content (in the form of docs or videos) is replacing (printed) instruction manuals that technicians are using in order to get through their daily work. One of the most popular ways to demonstrate any kind of technical procedure using digital content is capturing the procedure with a video. Usually, that guidance how-to video would show an experienced technician demonstrating the step-by-step procedure on the object of interest. Creating these kind of guidance how-to videos requires an expert to have physical access to the object of interest, carrying out and demoing the work. In a different set up, there might be CAD models representing the object and an expert can use existing software tools to create animated videos, usually for assembly tasks.

Another emerging technology that has been embraced for technical guidance is Augmented Reality (AR), allowing technicians to get overlaying instructions augmented on their live camera feed (on mobile device or headset), rather than looking for the guidelines in books and manuals. AR also provides accurate anchoring of the content to the real world objects. However, this AR technology is limited to supported devices, requires special applications to be used, and therefore can't be accessed by everyone, everywhere, anytime.

However, guidance how-to videos are very accessible and can be played by any device without AR enablement, anytime.

SUMMARY

Aspects of the present invention disclose a computer-implemented method, a computer system and computer program product for generating instructional animated videos based on 2D images. The computer implemented method may be implemented by one or more computer processors and may include: receiving one or more images from user; receiving one or more procedures from the user; rendering animated video by leveraging use of animator algorithm and based on the one or more images, the one or more procedures; and exporting the animated video to one or more viewers.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which:

FIG. 2A illustrates several images along with instructions, as it pertains to servicing a desktop PC, in accordance with an embodiment of the present invention;

FIG. 2B illustrates a high level flowchart of video animation component 111, as it pertains to servicing a desktop PC, in accordance with an embodiment of the present invention;

FIG. 3A illustrates the capturing a target object and transferring the image as an input into the AR Modeling Studio software, in accordance with an embodiment of the present invention;

FIG. 3B illustrates the image editing step of the target object (i.e., car engine) into the AR Modeling Studio software, in accordance with an embodiment of the present invention;

FIG. 3C illustrates adding annotation to the target object (i.e., hood of the car) in AR Modeling Studio software, in accordance with an embodiment of the present invention;

FIG. 3D illustrates the subsequent step of opening the hood of the car adding annotation to the sensor in AR Modeling Studio software, in accordance with an embodiment of the present invention;

FIG. 3E illustrates an expanded view of the location of the sensor in AR Modeling Studio software, in accordance with an embodiment of the present invention;

FIG. 3F illustrates adding additional annotation as instructions to the expanded view of the sensor in AR Modeling Studio software, in accordance with an embodiment of the present invention;

DETAILED DESCRIPTION

Figure 1A:
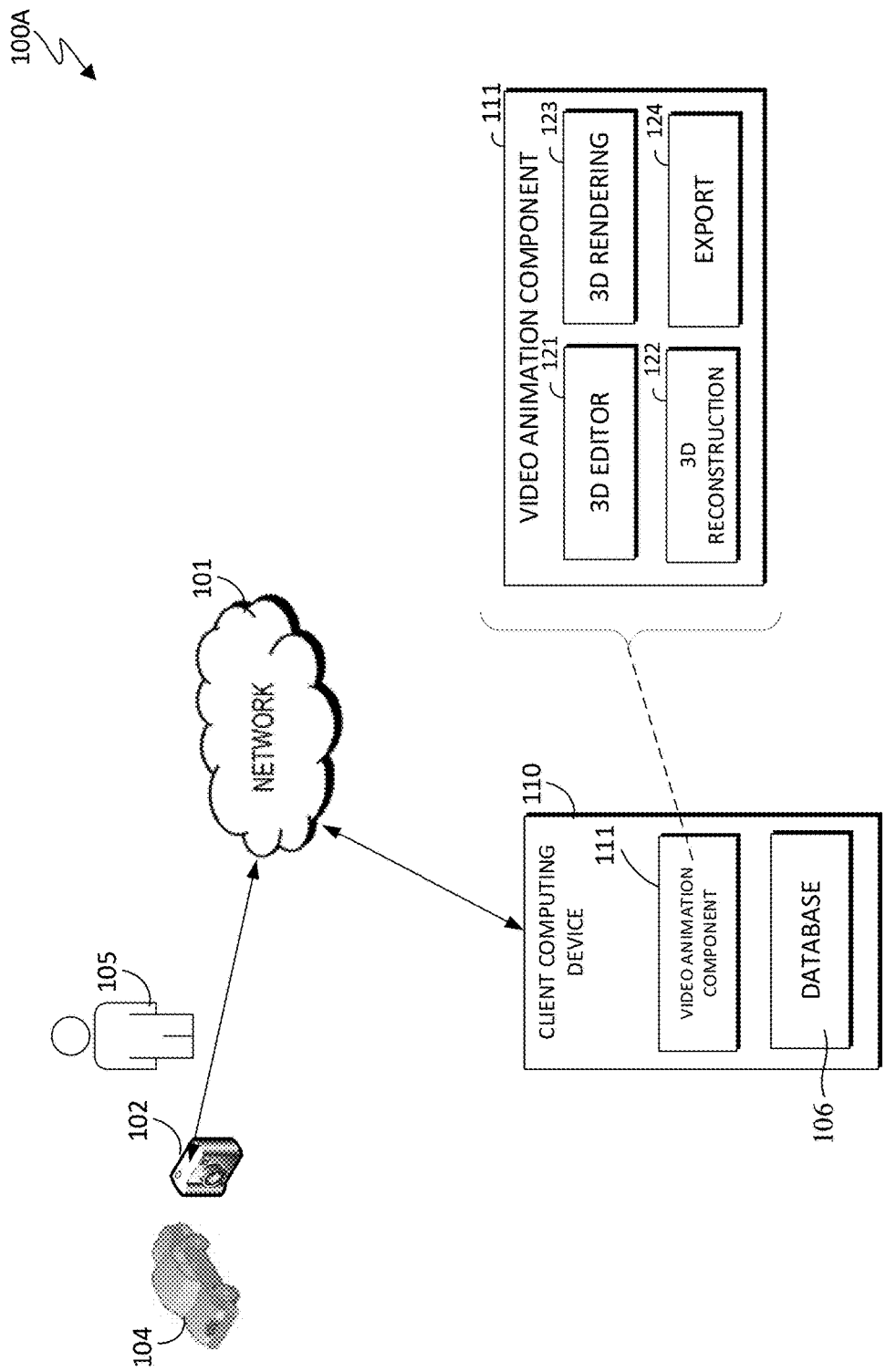
FIG. 1A is a functional block diagram illustrating a video animation environment, designated as 100A, in accordance with an embodiment of the present invention.

In the current state of art of creating "how-to" videos, an experienced technician need to demonstrate the step-by-step procedure on the object of interest. Another option is to create basic manual using CAD model and create basic animation using a relevant software tool. These options are very limited, not always available, and require experts to create the animation for each new procedure.

Embodiments of the present invention recognizes the deficiencies in the current state of art and provides an approach, for creating instructional videos, without physical access to the object or to the object CAD models as a prerequisite. The only prerequisite is a having some images or a video of the object, and a knowledge about the required procedure. The user has only to capture a video of the object once, adding his instructions, while a dedicated software will build a 3D model and the instructional animated video. It is noted that the term "user" and "director" may be used interchangeably. A "director" is a "user" that creates the 3D animation video from scratch (e.g., takes initial images, adds text annotation, define steps, renders the video and post-processing to the video). A user can be a director or can be the person (i.e., viewer) that performs the steps based on watching the 3D animated instructional video. The disclosure will attempt to clarify the term "user" based on the examples and scenarios.

The approach automatically creates instructional how-to 3D animated videos from a simple video (or a set of images) of the object of interest to which instructions are added manually. It is noted that instructions can be anchored or can general instructions without anchors. Generally, the overlay to the 3D model is added manually. The approach can be generally summarized by the following steps: i) capturing a simple video that covers the object from all relevant angles, or multiple videos covering different states of the object (e.g., open, close, etc.). A set of images representing such a video are also a valid input; ii) reconstructing a 3D model from each video or set of images (represented by a point cloud/mesh/ . . . ) using known methods such as structure from motion (SFM); iii) using a 3D editor, creating procedure steps and annotating points of interest on the 3D models, adding content, text and icons. Since the data can be anchored to the 3D model, it will stick to where the user placed it even if the user rotates and manipulates the 3D model; iv) render a video of the 3D model (3D animation) playing the step by step instructions, anchored to where the user originally placed them; and v) the video can now be published and used by a field technician as an instructional how-to video.

Other embodiments of the present invention may recognize one or more of the following facts, potential problems, potential scenarios, and/or potential areas for improvement with respect to the current state of the art: i) users can create 3D animated videos without any prior knowledge of machine and/or 3D software, ii) does not require any information from the local user, only information pertain to the video and set of images are needed, iii) generate general instructions (not just assembly) and gives the user to add its own content, iv) can create offline instructional videos on different environments, any time, v) none of the users need to have any physical access to the machine, the only need is a one-time video capturing the object, vi) user doesn't define the animation properties; the focus is only on the content (i.e., animation in generated automatically), vii) leverage AR content\AR tools for non-AR users, when AR is not accessible/not an option and reuse data to create many different How to videos in seconds.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1A is a functional block diagram illustrating a video animation environment, designated as 100A, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Video animation environment 100A includes product network 101, image capture device 102, target object 104, director 105 and client computing device 110.

Network 101 can be, for example, a telecommunications network, a local area network (LAN), a wide area network (WAN), such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between client computing device 110 and other computing devices (not shown) within video animation environment 100A. It is noted that other computing devices can include, but is not limited to, any electromechanical devices capable of carrying out a series of computing instructions.

Image capture device 102 are devices that can optically/visually capture objects and store the images (e.g., moving images, still images, etc.) digitally. For example, image capture device 102 can be a camera (e.g., thermal, 3D, point-shoot, etc.) and video recording camera.

Target objects 104 are objects of interest and are the basis from which the user can create an animated instruction video. For example, target object 104 can include computers, vehicle, gas grill, plumbing and HVAC system.

Director 105 is a person/user (an expert in a particular field/subject) who is creating the 3D images and/or videos. The term "viewer" may be used as a substitute for a "user", someone who views the created video. The term "expert" may be used as a substitute for the term, "director."

Client computing devices 110 are computing devices that has the capability of creating 3D animated instruction videos based on user provided images and additional instructions from a user. Client computing devices 110 can allow for digital transfer and storage of captured images from image capture device 102. Client computing devices 103 can also contain 3D editing and rendering software that allows further digital manipulation (e.g., editing, cropping, light enhancement, etc.) and rendering of captured images.

Client computing devices 110 can be a standalone computing device, a management server, a web server, a mobile computing device, or any other electronic device or computing system capable of receiving, sending, and processing data. In other embodiments, client computing device 110 can represent a server computing system utilizing multiple computers as a server system, such as in a cloud computing environment. In another embodiment, client computing device 110 can be a laptop computer, a tablet computer, a netbook computer, a personal computer (PC), a desktop computer, a personal digital assistant (PDA), a smart phone, or any other programmable electronic device capable of communicating other computing devices (not shown) within video animation environment 100A via network 101. In another embodiment, client computing device 110 represents a computing system utilizing clustered computers and components (e.g., database server computers, application server computers, etc.) that act as a single pool of seamless resources when accessed within video animation environment 100A.

Embodiment of the present invention can reside on client computing device 110. Client computing device 110 includes video animation component 111 and database 116.

Video animation component 111 provides the capability of receiving instructions from the user, receiving the images and creating 3D animated instruction video. In the depicted embodiment, video animation component 111 includes 3D editor component 121, 3D reconstruction component 122, 3D rendering component 123 and export component 124. A few use case scenarios will be used to illustrate the functionality and capability of video animation component 111 including the subcomponents. The first use case scenario involves troubleshooting a desktop PC (see FIGS. 2A-2B). The second use case scenario involves troubleshooting an engine sensor of a car (see FIGS. 3A-3F).

Database 116 is a repository for data used by video animation component 111. Database 116 can be implemented with any type of storage device capable of storing data and configuration files that can be accessed and utilized by client computing device 110, such as a database server, a hard disk drive, or a flash memory. Database 116 uses one or more of a plurality of techniques known in the art to store a plurality of information. In the depicted embodiment, database 116 resides on client computing device 110. In another embodiment, database 116 may reside elsewhere within video animation environment 100A, provided that video animation component 111 has access to database 116. Database 116 may store information associated with, but is not limited to, 3D images and/or rendering of all exiting objects, how-to (i.e., instructional) animations video and completed rendered videos.

As is further described herein below, 3D editor component 121 of the present invention provides the capability of, i) receiving images/videos from the director, ii) define a procedure and iii) generate animation. In regard to the capability in section i), "receiving images", a director/expert can upload the video (or set of images) from image capture device 102 or from client computing device 103. 3D editor component 121 can retrieve images from another computer or directly uploaded by the user (see 140 arrow of FIG. 1B).

Figure 1B:
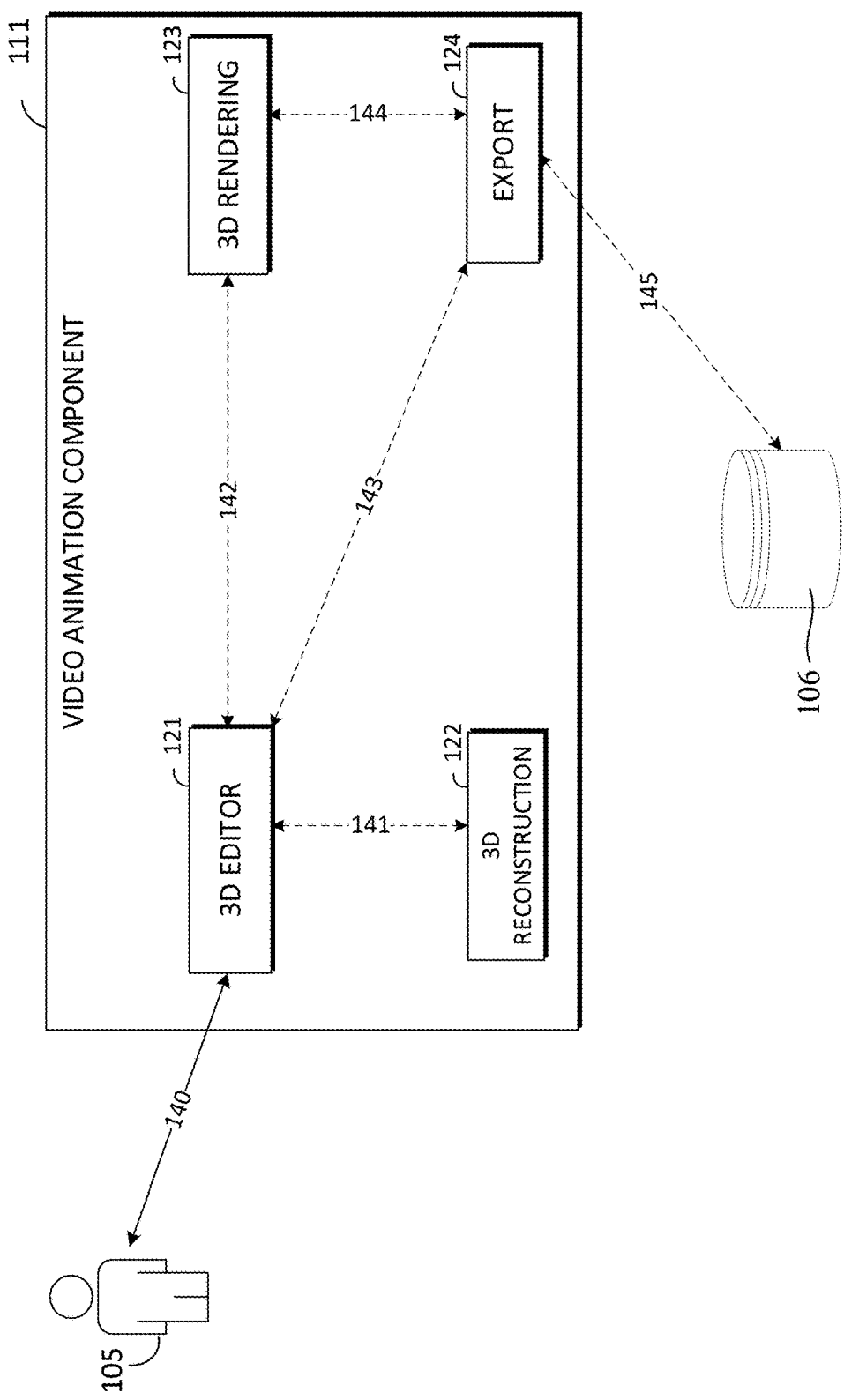
FIG. 1B illustrates the interaction between the subcomponents of video animation component 111, in accordance with an embodiment of the present invention.

In regard to the capability of section ii), "defining a procedure", 3D editor component 121 can accept an input (from the director) for a procedure via a GUI (see 140 arrow of FIG. 1B). A GUI (graphic user interface), allows the director interaction with video animation component 111, via 3D editor component 121, can be similar to most video editing software. An example of the GUI, using IBM AR Modeling Studio can be found in FIGS. 3A through 3F and is provided as an illustrated example.

The procedure can include instructional steps, location of anchored content, introduction clips, use of video scene transition and instructional text/annotations additional media. Other procedures can include directions such as, but is not limited to, i) adding an introduction clip, ii) use a certain type of video scene transition (e.g., swipes, fades, etc.), iii) using different camera angles and iv) zoom capability. In regard to the capability of section iii), "generate animation", 3D editor component 121 can interface with 3D rendering component 123, which will handle the bulk of the actual animation/rendering work.

Furthermore, 3D editor component 121 allows users (i.e., directors) to make additional changes/edits to the created 3D animation video (i.e., after 3D rendering). For example, after rendering the initial version, the director decides that he needs to add additional objects and/or instructions/annotations to the final scene due to a last minute idea.

As is further described herein below, 3D reconstruction component 122 of the present invention provides the capability of, i) reconstructing 3D models from received images (via 3D editor component 121, see 141 arrow of FIG. 1B) and ii) provide additional computation (i.e., camera positions for each frame). In regard to subsection ii), "provide additional computation . . . " 3D reconstruction component 122 sends back those additional computation to 3D editor component 121.

As is further described herein below, 3D rendering component 123 of the present invention provides the capability of rendering a video in 3D by leveraging an animator algorithm. The term "rendering" means "video rendering", which refers to a process through which a computing system process information from a data source and transforms that information into a moving image.

Animator algorithm is a process for defining how the animation would look like. Additionally, animator algorithm has the following characteristics and capabilities: i) decide when to zoom in and zoom out, ii) when annotations are visible, iii) what camera angles we use and iv) when content should be played.

The internal algorithm can be based on animation guidelines (e.g., principles, rules, etc.). The first animation guideline relates to camera position: SFM cameras are used to initialize the camera position. The second animation guideline relates to definition of camera trajectory "stops." For each annotation, the system computes an ideal target camera pose that reveals the content, taking into the following camera trajectory factors: i) visibility of annotations in the 3D space, ii) graphical content/text size, iii) point cloud density around the annotation (controls the zoom in/out used for in a very detailed area), iv) proximity to the SfM (structured from motion) cameras trajectory and v) "pause" duration—considering the text length. The third animation guideline mandates that a smooth camera trajectory is created between the stops.

The process of rendering by 3D rendering component 123 can include any existing techniques well known in the art, such as, point cloud rendering (leverage 3D scanned inputs), MeshLab, CloudCompare and 3D reconstruction using structure from motion (SfM).

In an alternate embodiment, if the rendering technique is using 3D point cloud then the following features and steps (not necessary in a particular order) can be used to illustrate and guide the rendering process: i) the anchored content to the output video is done by using the camera positions from the 3D reconstruction solution (SfM) as a hint for the initial camera position of the video, ii) the software can build the camera trajectory stops, iii) for each anchored point, the software can compute an ideal target camera pose that reveals the anchored content, based on, a) the size of the content (e.g., for a large image annotation we will need to zoom out), b) the distance of the object from the SFM camera, c) a density measure of the 3D model area around the anchored point (if the 3D model has a lot of details around the anchored point we would want to zoom in) and iv) the software can build the camera trajectory between each stop, which means that the software computes a linear line between each two points and translate the camera along this line rotation: a) software can rotate the camera along the translation from one rotation angle to the next one. For example, when the annotated point is in the camera's field of view, the software can show the annotated content. It is noted that after the animation has been "directed" properly, the rendering process will start to create the video itself. The user/director does not need to define a path/edit the animation.

As is further described herein below, export component 124 of the present invention provides the capability of exporting the finished 3D video animation file into a various file formats (e.g., MOV, MP4, AVI, etc.) in order to be used on various platforms (e.g., social media, web platforms, video file sharing sites, etc.). Export component 124 contains all the necessary video codecs to convert the rendered file in the native format into another universally recognized formats.

FIG. 1B illustrates the interaction between the subcomponents of video animation component 111, in accordance with an embodiment of the present invention.

Arrow 140 represents the interaction between director 105 (i.e., expert) with 3D editor component 121. This interaction can include uploading images/videos and providing procedures from the user.

Arrow 141 represents the interaction between 3D editor component 121 and 3D reconstruction component 122. This interaction includes reconstructing a 3D model from 2D images and providing additional computation back to 3D editor component 121.

Arrow 142 represents the interaction between 3D editor component 121 and 3D rendering component 123. This interaction can include receiving instruction from 3D editor component 121 to 3D rendering component 123 to begin the video animation process and send the result of the animation back.

Arrow 143 represents the interaction between 3D editor component 121 and export component 124. This interaction can include receiving instruction from 3D editor component 121 to export component 124 to convert the animated video into a suitable file format that easily consumed by viewers.

Arrow 144 represents the interaction between 3D rendering component 123 and export component 124. This interaction can include receiving instruction from 3D rendering component 123 to export component 124 to convert the animated video into a suitable file format that easily consumed by viewers.

Arrow 145 represents the interaction between export component 124 and database 106. This interaction can include storing the finished video file in database 106.

Figure 2A:
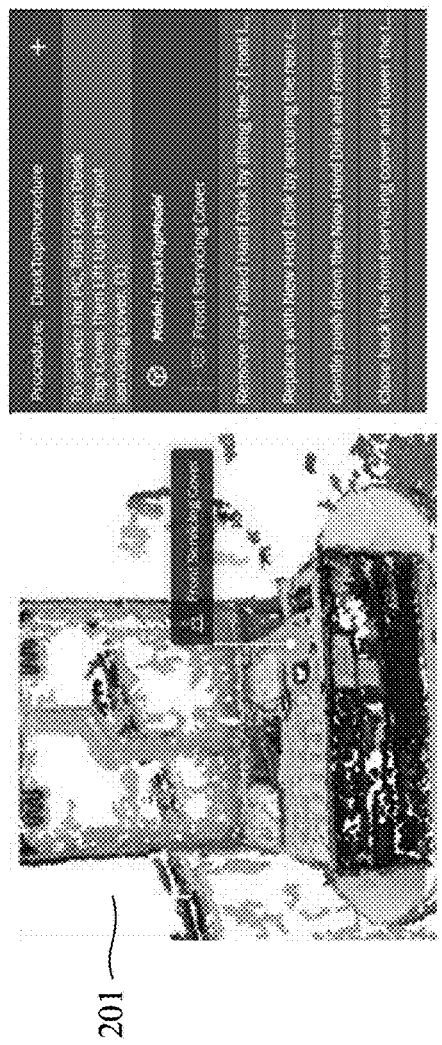
FIG. 2A-2B illustrates a high level overview of the use of video animation component 111, as it pertains to servicing a desktop PC, in accordance with an embodiment of the present invention.
Figure 2A:
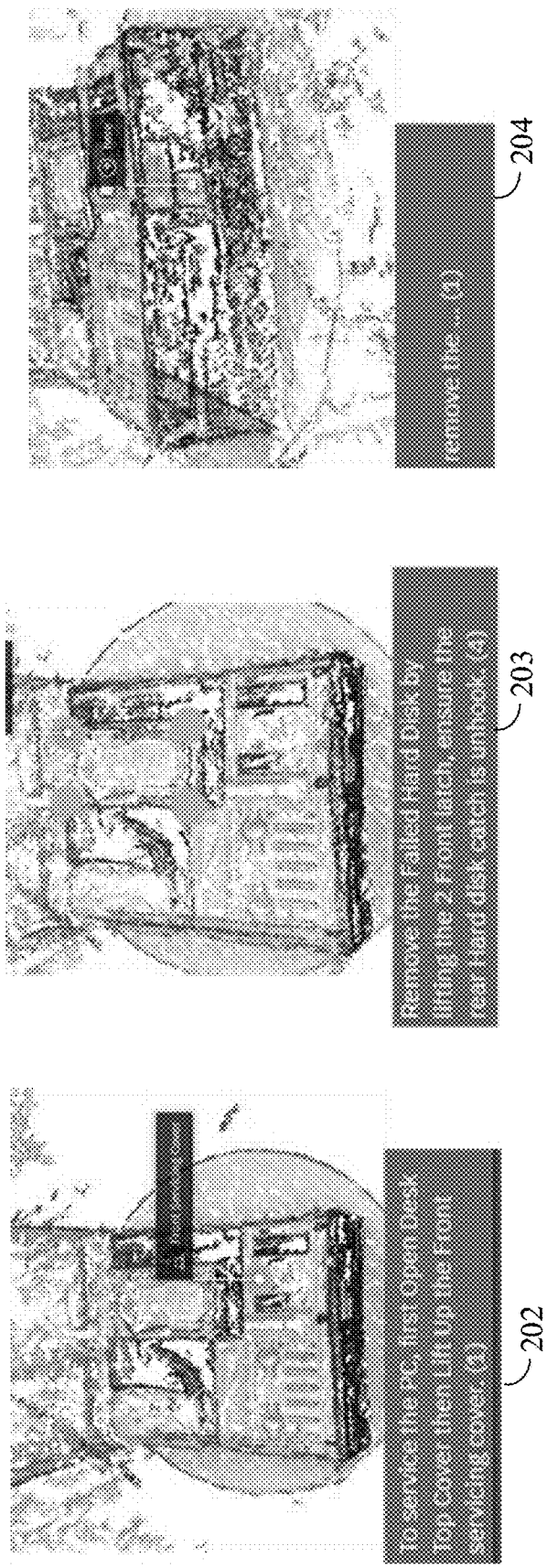
Figure 2B:
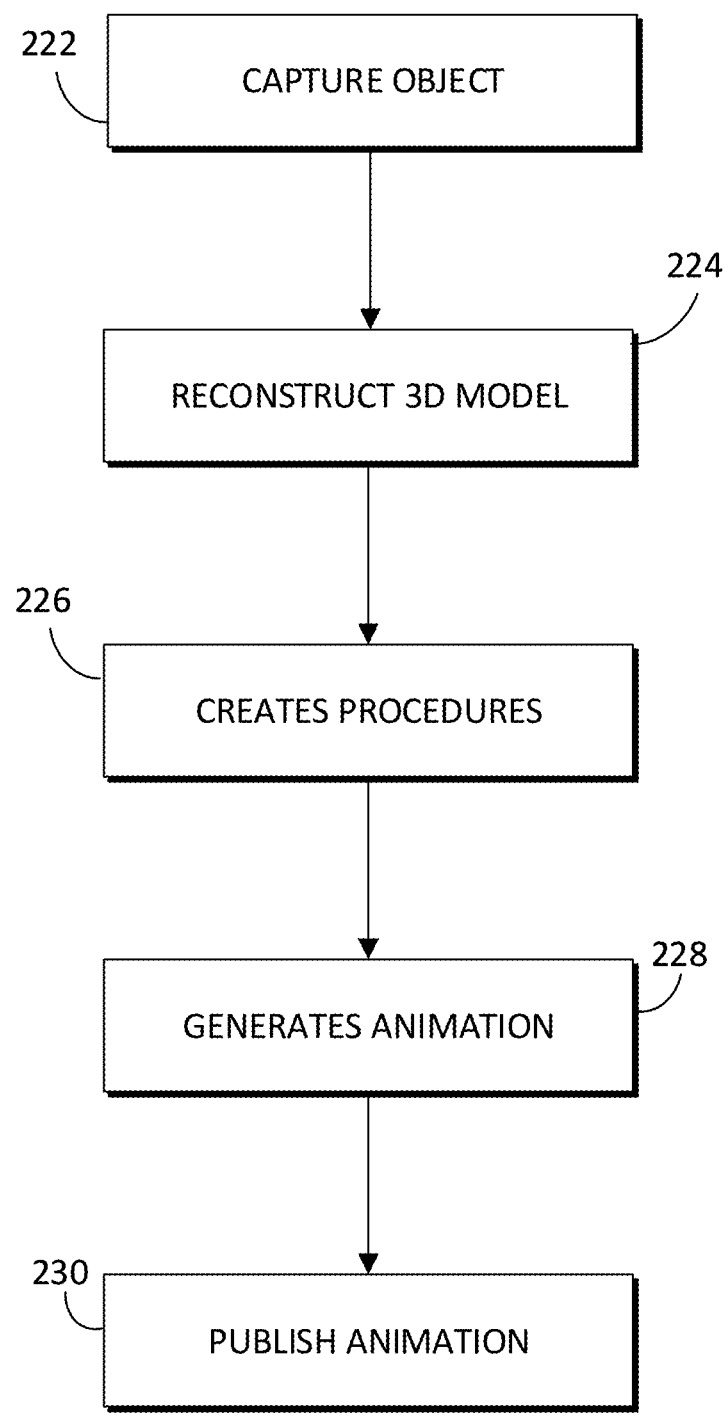

FIG. 2A-2B illustrates a high-level overview of the use of video animation component 111, as it pertains to servicing a desktop PC, in accordance with an embodiment of the present invention. FIG. 2A illustrates several images along with instructions and FIG. 2B illustrates a high-level flowchart of video animation component 111, as it pertains to servicing a desktop PC. There are several images of desktop PC (see FIG. 2A) used in the first use case scenario. Image 201 shows the first step in troubleshooting by locating the cover of the desktop. Image 202, 203 and 204 shows images of various stages of opening the desktop to locate the component that needs to be serviced.

FIG. 2B contains the following high-level steps, i) capture a video of the object (step 222), ii) reconstructs 3D model (step 224), iii) creates procedure (step 226), iv) generates animation (step 228) and vi) publish animation (step 230). Step 222 through step 226 can be applied to the first use case scenario as illustrated by FIG. 2A.

FIG. 3A-3F are screenshots of instruction steps to troubleshoot a sensor in a car (second use case scenario) by creating 3D animation video utilizing a 3D editing software, such as using AR Modeling Studio software, in accordance with an embodiment of the present invention. Referring to the original use case scenario, where the director is creating an instructional video on replacing a bad engine sensor. In this scenario, there are four major steps (and scenes) for troubleshooting the engine sensor (as defined by the director). The steps are, i) open the hood, ii) locate the sensor, iii) visually inspect the sensor and iv) remove and/or replace the sensor.

Figure 3A:
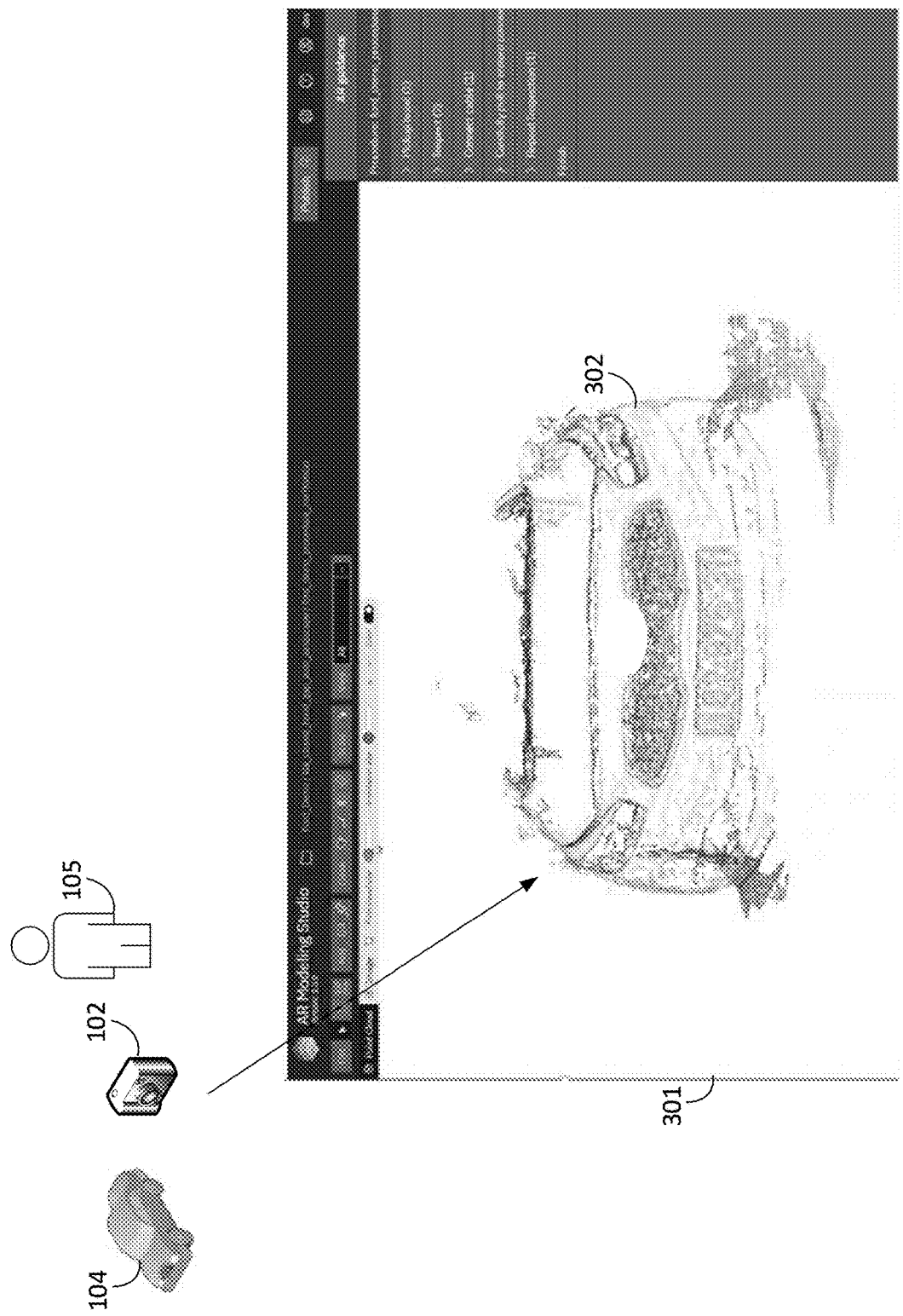
FIG. 3A-3F are screenshots of instruction steps to troubleshoot a sensor in a car by creating 3D animation video utilizing a 3D editing software, such as using AR Modeling Studio software, in accordance with an embodiment of the present invention.

FIG. 3A illustrates the capturing a target object and transferring the image as an input into the AR Modeling Studio software, in accordance with an embodiment of the present invention. FIG. 3A includes screenshot of a GUI (graphic user interface) 301 to instruct a 3D rendering software to create animated instruction videos. The target object is front hood 302 of a car. FIG. 3A is the initial step of providing simple images (taken by the director) where the images will be processed and/or received by video animation component 111.

Figure 3B:
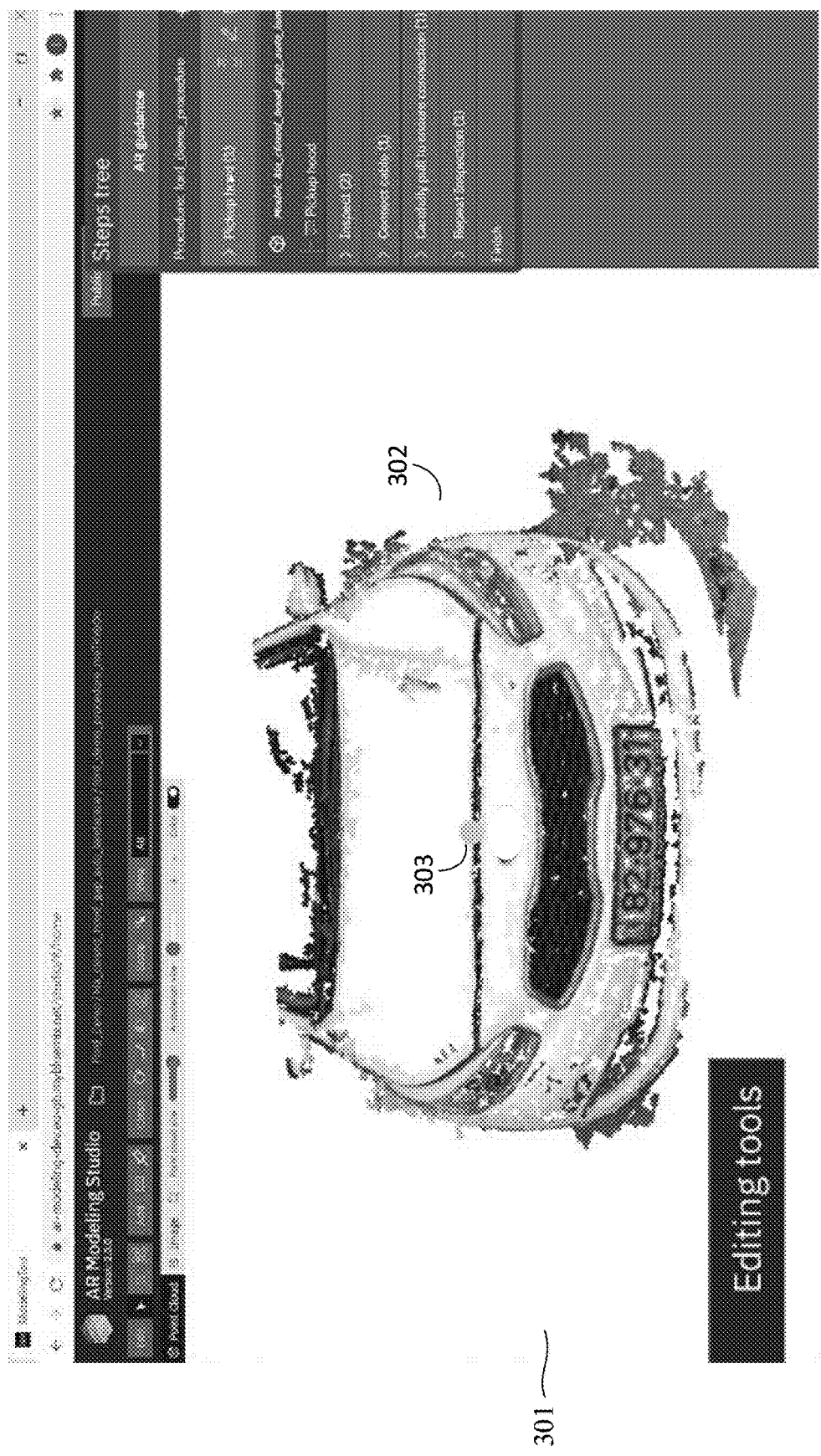

FIG. 3B illustrates the image editing step of the target object (i.e., car engine) into the AR Modeling Studio software, in accordance with an embodiment of the present invention. Hood latch 303 represents an annotation point that can include instructions (i.e., lift here to access the engine bay) for viewers to perform after watching the video.

Figure 3C:
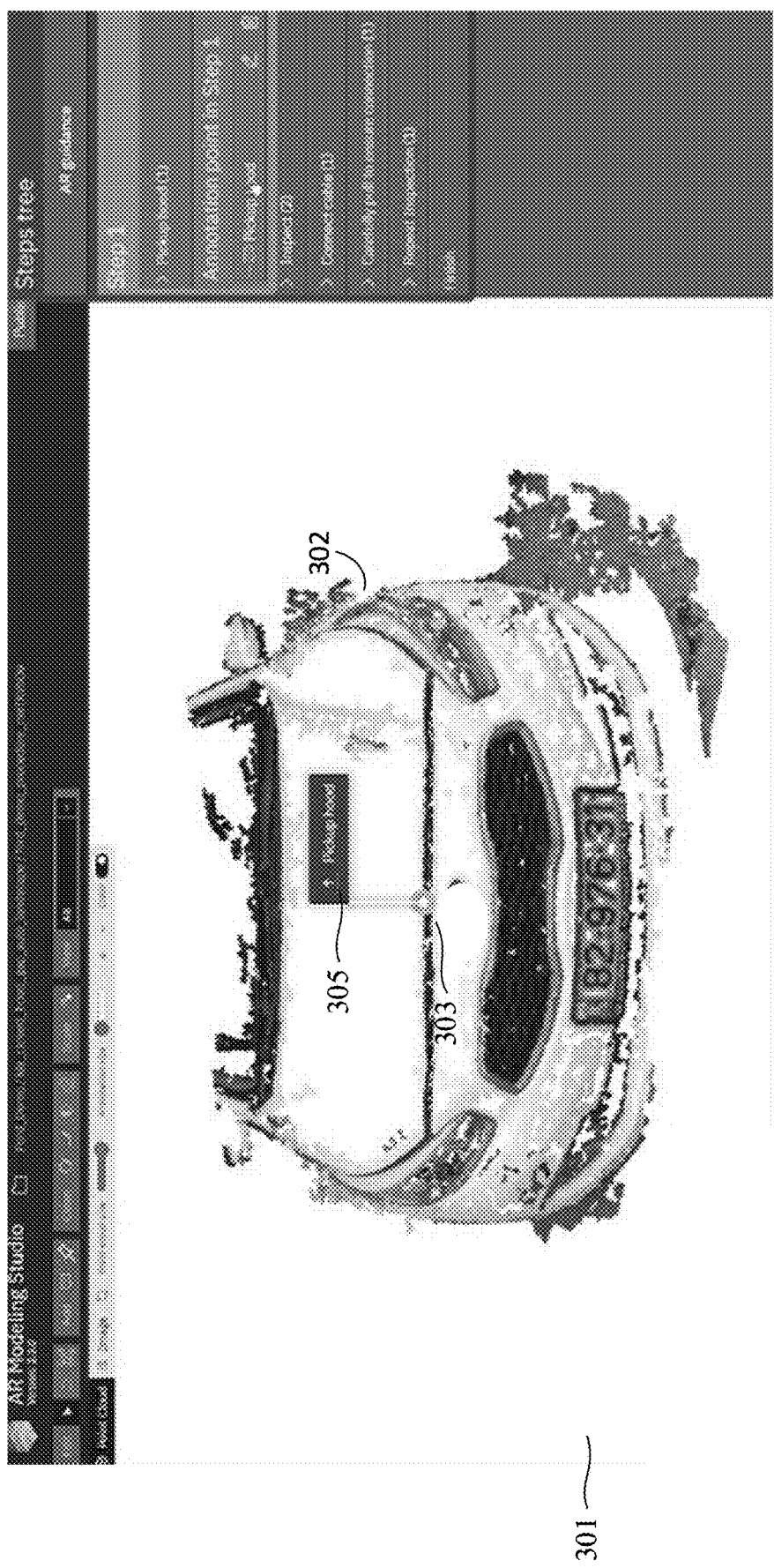

FIG. 3C illustrates adding annotation to the target object (i.e., hood of the car) in AR Modeling Studio software, in accordance with an embodiment of the present invention. The director would specify instructions for the first step, "opening the hood" (i.e., pick up hood 305) by annotating the textual instruction (i.e., anchored to point in the image such as hood latch 303).

Figure 3D:
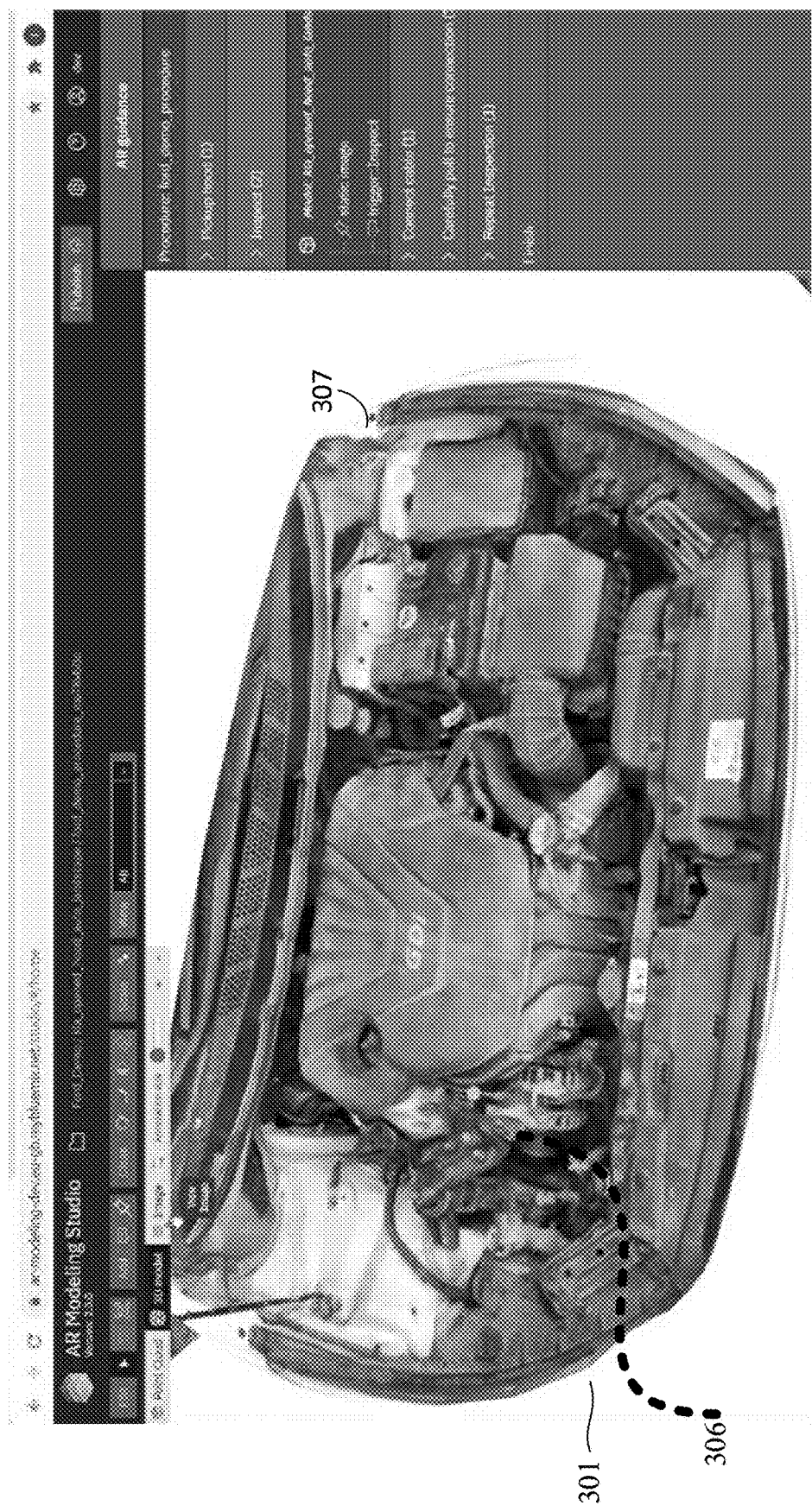

FIG. 3D illustrates the subsequent step of opening the hood of the car by adding annotation to the sensor (engine sensor 306) in AR Modeling Studio software, in accordance with an embodiment of the present invention. The director would specify the second major step, ("locate the sensor") based on the accompanying images (i.e., engine bay 307). Engine bay 307 illustrates the picture (i.e., engine bay with the hood open) after the viewer opens front hood 302. The location of engine sensor 306 can be seen with the new image/view (i.e., engine bay 307).

Figure 3E:
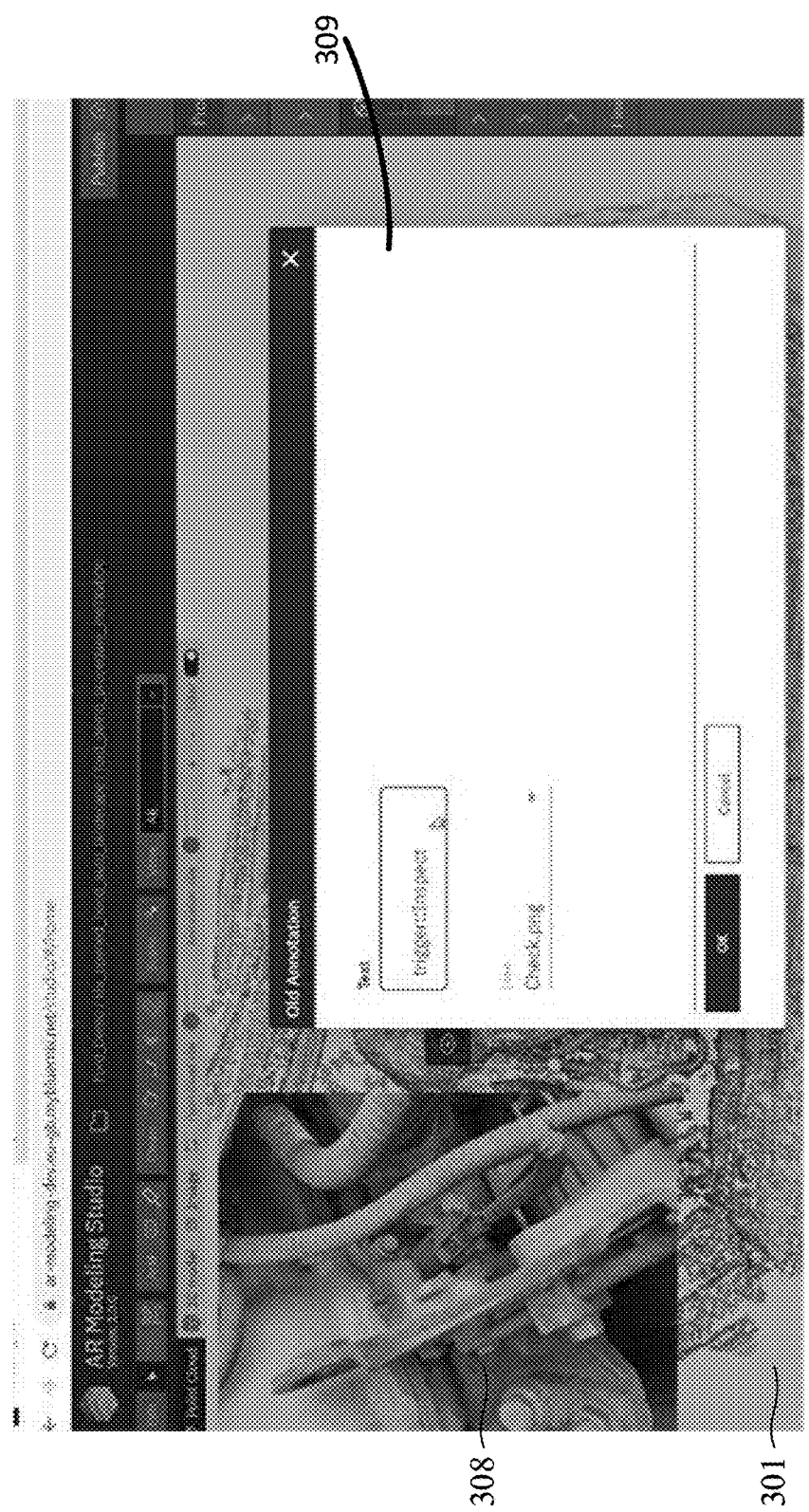

FIG. 3E illustrates an expanded view of the location of the sensor in AR Modeling Studio software, in accordance with an embodiment of the present invention. The director would specify the third major step, ("visually inspect the sensor") based on the accompanying image (i.e., large view Engine sensor 308). The step would include adding an annotation (i.e., inspect 309) to the image. In addition, other annotations can include additional text on how to tell if the sensor is bad and/or malfunctioning.

Figure 3F:
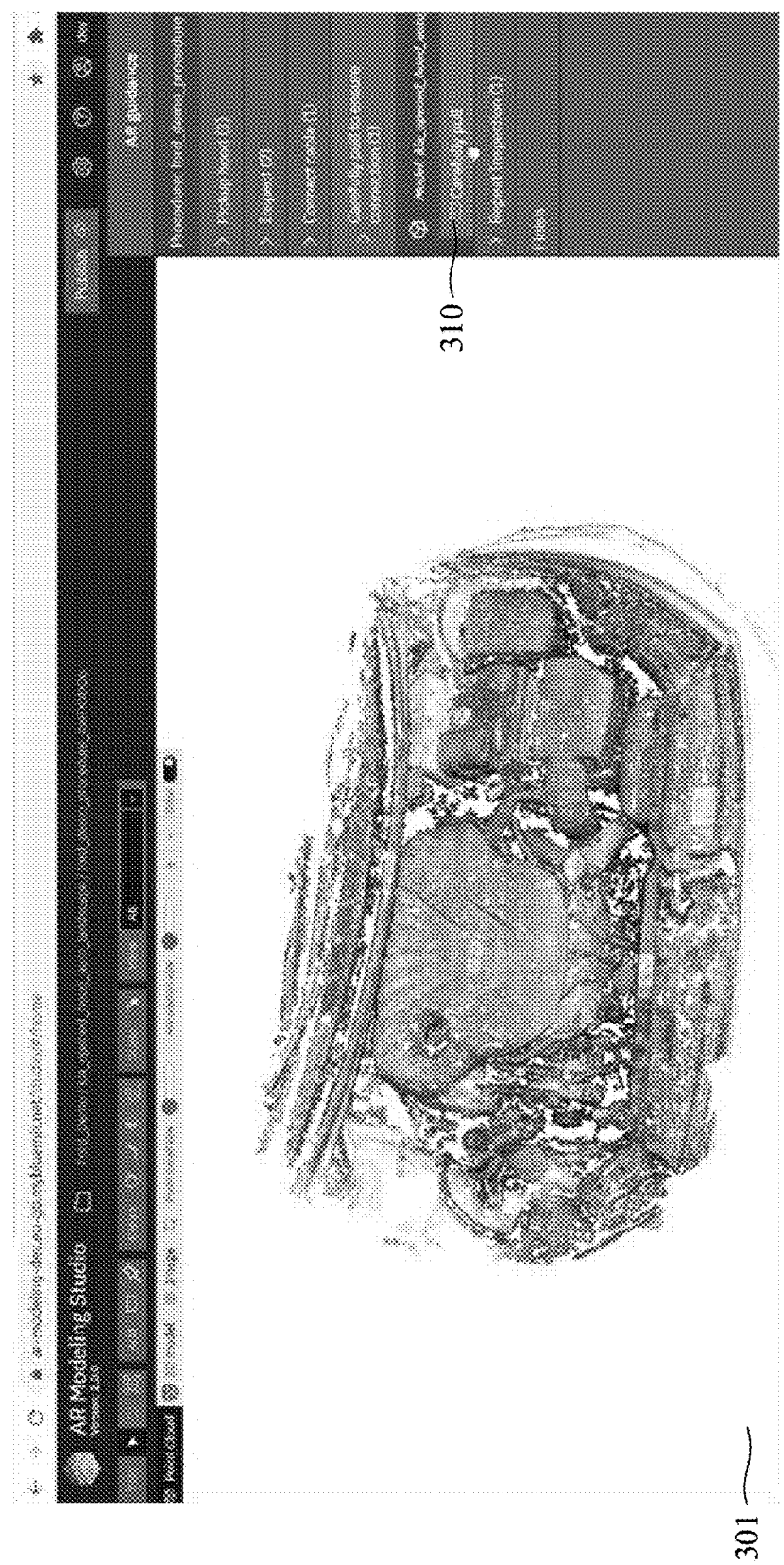

FIG. 3F illustrates the final step of replacing the sensor in AR Modeling Studio software, in accordance with an embodiment of the present invention. The director can add annotation (i.e., replace sensor 310) to the last step assuming the prior step, the viewer was able to discern that the sensor was bad. The last step can include additional text on how to pull the sensor from the socket.

Figure 4:
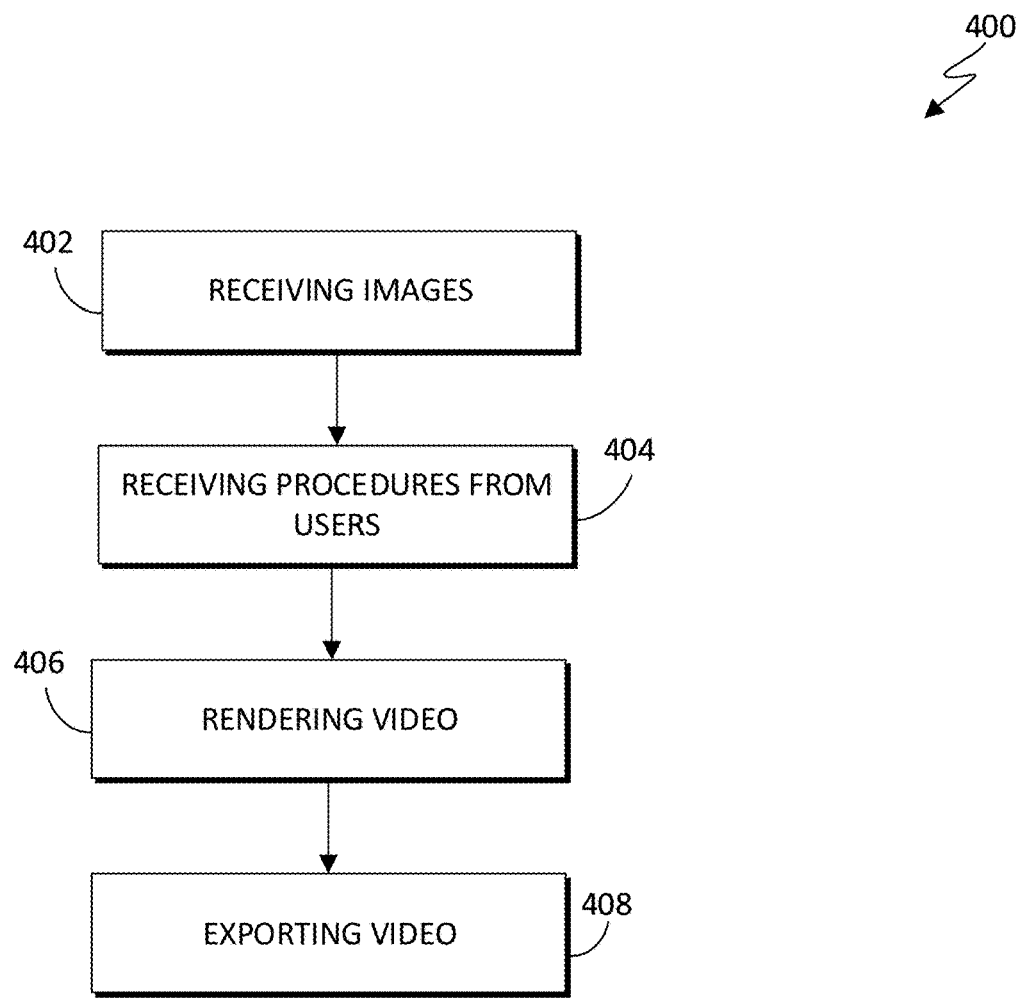
FIG. 4 is a high-level flowchart illustrating the operation of video animation component 111, designated as 400, in accordance with an embodiment of the present invention.

FIG. 4 is a flowchart illustrating the operation of video animation component 111, designated as 400, in accordance with another embodiment of the present invention. It is noted that FIGS. 3A through 3F can be helpful to illustrate the operational steps of video animation component 111. Furthermore, the user case scenario will be used to explain the flowchart.

Video animation component 111 receives images (step 402). In an embodiment, video animation component 111, through 3D editor component 121, receives images from the director. For example, referring to the use case of troubleshooting an engine sensor, a director takes a picture (with image capture device 102) of front hood of a car (i.e., 302) and uploads the image(s) to client computing device 110. Furthermore, client computing device 110, through 3D reconstruction component 122, converts the 2D images (front of the car) into a 3D model.

Video animation component 111 receives procedures from the users (step 404). In an embodiment, video animation component 111, through 3D editor component 121, receives instructions/procedures form the director. For example, the director may type a series of command (via keyboard) along with using the mouse into the GUI of client computing device 110. The commands/instructions are received by 3D editor component 121. Those commands can include the four major steps: i) open the hood, ii) locate the sensor, iii) visually inspect the sensor and iv) remove and/or replace the sensor. Based on the major steps, the director would add specific texts to the various scenes; choose camera angles and transitional effects between scenes. For example, (referring to FIG. 3C), the director would specify that the hood will open based on a viewer action (i.e., pick up hood at 305) to the hood latch of the car (i.e., 303) to that particular scene. Another step would be for the software to zoom into in on engine software 306 (FIG. 3D) and show a larger view (FIG. 3E) for the user to inspect the engine sensor (FIG. 3F). The director would add other text annotations to each scene until the entire instructional video/scenes have been completed. Thus, the director will define and specify instructional steps at each scene.

Video animation component 111 renders a video (step 406). In an embodiment, video animation component 111, through 3D rendering component 123 generates the 3D animated video based on the procedure and instructions from the director. Assuming that the director is satisfied with the final version, the video can be released to be consumed by viewers on a variety of platform. However, if the director is not satisfied (e.g., wants to add another step, edit current camera angles, etc.) then he can use make those changes via 3D editor component 121.

Video animation component 111 exports the video (step 408). In an embodiment, video animation component 111, through export component 124, the director can convert the final video into various formats once the director is satisfied with the finished product. For example, the director can convert the finished video file from the native file format into a universally viewable format such as MP4 (MPEG4 video format).

Figure 5:
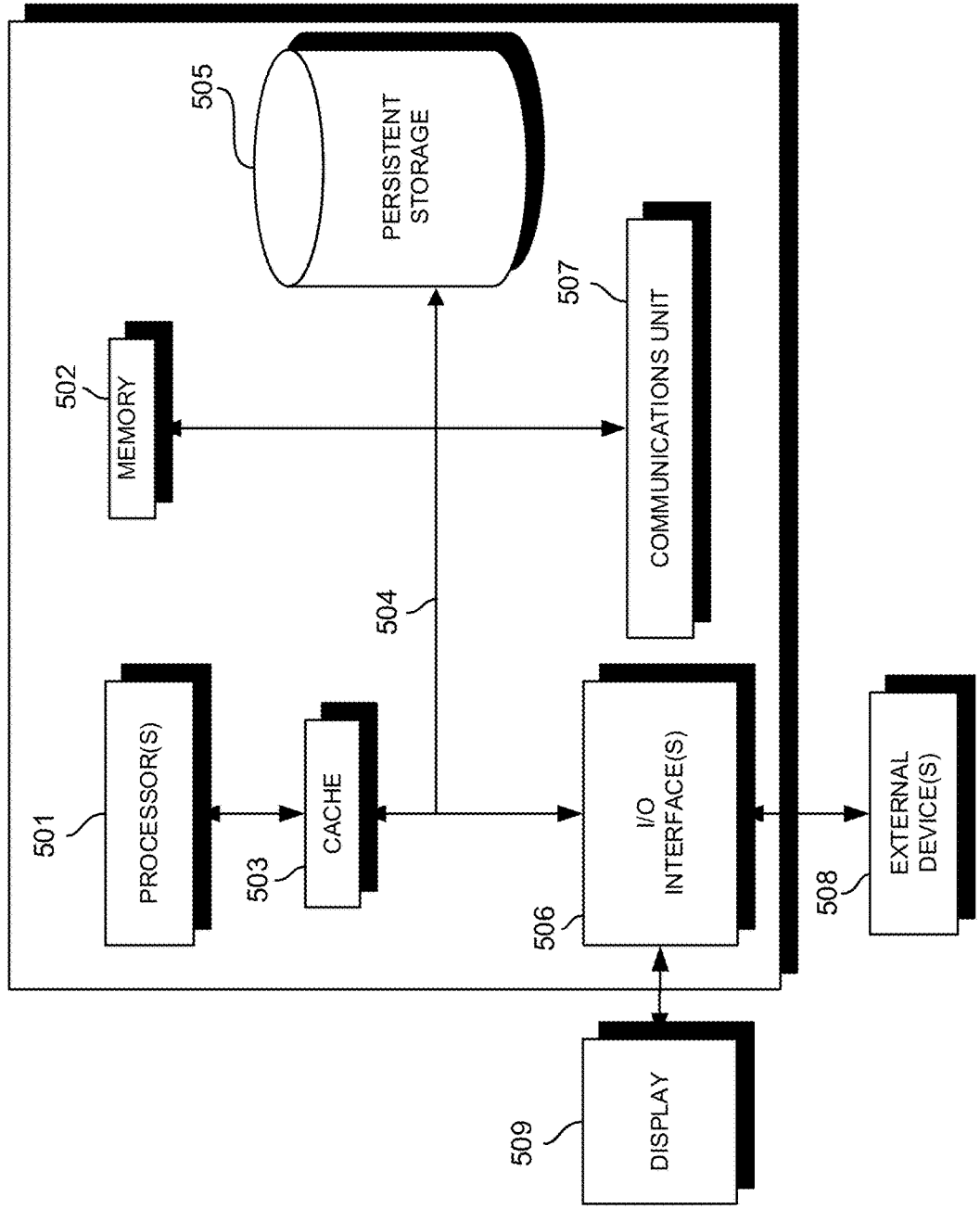
FIG. 5 depicts a block diagram, designated as 500, of components of a server computer capable of executing the video animation component 111 within the video animation environment, of FIG. 1, in accordance with an embodiment of the present invention.

FIG. 5, designated as 500, depicts a block diagram of components of video animation component 111 application, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

FIG. 5 includes processor(s) 501, cache 503, memory 502, persistent storage 505, communications unit 507, input/output (I/O) interface(s) 506, and communications fabric 504. Communications fabric 504 provides communications between cache 503, memory 502, persistent storage 505, communications unit 507, and input/output (I/O) interface(s) 506. Communications fabric 504 can be implemented with any architecture designed for passing data and/or control information between processors (such as microprocessors, communications and network processors, etc.), system memory, peripheral devices, and any other hardware components within a system. For example, communications fabric 504 can be implemented with one or more buses or a crossbar switch.

Memory 502 and persistent storage 505 are computer readable storage media. In this embodiment, memory 502 includes random access memory (RAM). In general, memory 502 can include any suitable volatile or non-volatile computer readable storage media. Cache 503 is a fast memory that enhances the performance of processor(s) 501 by holding recently accessed data, and data near recently accessed data, from memory 502.

Program instructions and data (e.g., software and data x10) used to practice embodiments of the present invention may be stored in persistent storage 505 and in memory 502 for execution by one or more of the respective processor(s) 501 via cache 503. In an embodiment, persistent storage 505 includes a magnetic hard disk drive. Alternatively, or in addition to a magnetic hard disk drive, persistent storage 505 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505. Video animation component 111 can be stored in persistent storage 505 for access and/or execution by one or more of the respective processor(s) 501 via cache 503.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data (e.g., video animation component 111) used to practice embodiments of the present invention may be downloaded to persistent storage 505 through communications unit 507.

I/O interface(s) 506 allows for input and output of data with other devices that may be connected to each computer system. For example, I/O interface(s) 506 may provide a connection to external device(s) 508, such as a keyboard, a keypad, a touch screen, and/or some other suitable input device. External device(s) 508 can also include portable computer readable storage media, such as, for example, thumb drives, portable optical or magnetic disks, and memory cards. Program instructions and data (e.g., video animation component 111) used to practice embodiments of the present invention can be stored on such portable computer readable storage media and can be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for generating 3D (three dimensional) instructional animated videos based on 2D (two dimensional) images, the computer-method comprising:
receiving one or more images from user;
receiving one or more procedures from the user, wherein the one or more procedures further comprises different camera angles, instructional annotations and zoom capability;
rendering 3D animated video by leveraging use of animator algorithm and based on the one or more images, the one or more procedures and wherein the animator algorithm is based on one or more animation guidelines and wherein first animation guidelines of the one or more animation guidelines further comprises camera position initialized by SfM (structured from motion) cameras, and second animation guidelines of the one or more animation guidelines further comprises of camera trajectory stops relating to the instructional annotations and the instructional annotations are based on ideal camera trajectory factors; and
exporting the animated video to one or more viewers.

2. The computer-implemented method of claim 1, further comprising:
reconstructing one or more 3D models based on the one or more images.

3. The computer-implemented method of claim 1, wherein receiving the one or more images from user further comprising:
capturing one or more objects with a camera; and
uploading the one or more images of the one or more objects.

4. The computer-implemented method of claim 1, wherein receiving the one or more procedures from the user further comprising:
accepting input from the user via a GUI (Graphical User interface).

5. The computer-implemented method of claim 1, wherein the one or more procedures further comprises instructional steps, location of anchored content, introduction clips and use of video scene transition.

6. The computer-implemented method of claim 1, wherein exporting the animated video to the one or more viewers further comprises:
converting the animated video into one or more video file formats; and
publishing the one or more video file format onto a web platform.

7. The computer-implemented method of claim 1, wherein rendering animated video by leveraging use of 3D point cloud technique.

8. The computer-implemented method of claim 1, wherein the ideal camera trajectory factors further comprises of visibility of annotations in the 3D space, graphical content/text size, point cloud density around the annotation, proximity to the SfM (structured from motion) cameras trajectory and pause duration.

9. A computer program product for generating 3D (three dimensional) instructional animated videos based on 2D (two dimensional) images, the computer program product comprising:
one or more computer readable storage media and program instructions stored on the one or more computer readable storage media, the program instructions comprising:
program instructions to receive one or more procedures from the user, wherein the one or more procedures further comprises different camera angles, instructional annotations and zoom capability;
program instructions to render 3D animated video by leveraging use of animator algorithm and based on the one or more images, the one or more procedures and wherein the animator algorithm is based on one or more animation guidelines and wherein first animation guidelines of the one or more animation guidelines further comprises camera position initialized by SfM (structured from motion) cameras, and second animation guidelines of the one or more animation guidelines further comprises of camera trajectory stops relating to the instructional annotations,
and the instructional annotations are based on ideal camera trajectory factors, where in the ideal camera trajectory factors; and
program instructions to export the animated video to one or more viewers.

10. The computer program product of claim 9, wherein the one or more procedures further comprises instructional steps, location of anchored content, introduction clips and use of video scene transition.

11. The computer program product of claim 9, further comprising:
program instructions to reconstruct one or more 3D models based on the one or more images.

12. The computer program product of claim 9, wherein program instructions receive the one or more images from user further comprising:
program instructions to capture one or more objects with a camera; and
program instructions to upload the one or more images of the one or more objects.

13. The computer program product of claim 9, wherein rendering animated video by leveraging use of 3D point cloud technique.

14. The computer program product of claim 9, wherein the ideal camera trajectory factors further comprises of visibility of annotations in the 3D space, graphical content/text size, point cloud density around the annotation, proximity to the SfM (structured from motion) cameras trajectory and pause duration.

15. A computer system for generating 3D (three dimensional) instructional animated videos based on 2D (two dimensional) images, the computer system comprising:
one or more computer processors;
one or more computer readable storage media;
program instructions stored on the one or more computer readable storage media for execution by at least one of the one or more computer processors, the program instructions comprising:
program instructions to receive one or more images from user;
program instructions to receive one or more procedures from the user, wherein the one or more procedures further comprises different camera angles, instructional annotations and zoom capability;

program instructions to render 3D animated video by leveraging use of animator algorithm and based on the one or more images, the one or more procedures and wherein the animator algorithm is based on one or more animation guidelines and wherein first animation guidelines of the one or more animation guidelines further comprises camera position initialized by SfM (structured from motion) cameras, and second animation guidelines of the one or more animation guidelines further comprises of camera trajectory stops relating to the instructional annotations, and the instructional annotations are based on ideal camera trajectory factors, where in the ideal camera trajectory factors; and program instructions to export the animated video to one or more viewers.

16. The computer system of claim 15, wherein the one or more procedures further comprises instructional steps, location of anchored content, introduction clips and use of video scene transition.

17. The computer system of claim 15, further comprising:

program instructions to reconstruct one or more 3D models based on the one or more images.

18. The computer system of claim 15, wherein program instructions receive the one or more images from user further comprising:

program instructions to capture one or more objects with a camera; and program instructions to upload the one or more images of the one or more objects.

19. The computer system of claim 15, wherein rendering animated video by leveraging use of 3D point cloud technique.

20. The computer system of claim 15, wherein the ideal camera trajectory factors further comprises of visibility of annotations in the 3D space, graphical content/text size, point cloud density around the annotation, proximity to the SfM (structured from motion) cameras trajectory and pause duration.

* * * * *